| United States Patent [19]
Collinge et al.

[11] 3,816,259
[45] June 11, 1974

[54] THERMOSTABLE LACTASE
[75] Inventors: Alfred E. Collinge, Churchville;
Clifford E. Neubeck, Hatboro, both of Pa.; John R. Udinsky, Palmyra, N.J.
[73] Assignee: Rohm and Haas Company, Philadelphia, Pa.
[22] Filed: Mar. 22, 1973
[21] Appl. No.: 343,997

Related U.S. Application Data
[63] Continuation of Ser. No. 123,857, March 12, 1971, abandoned.

[52] U.S. Cl. ................... 195/62, 195/66 R, 426/42
[51] Int. Cl. ............................................ C12d 13/10

[58] Field of Search ..................... 195/62, 65, 66 R

[56]      References Cited
          UNITED STATES PATENTS
3,592,739   7/1971   Sternberg ............................ 195/66

*Primary Examiner*—Lionel M. Shapiro

[57]               ABSTRACT

Thermostable lactase is obtained from a carbohydrate nutrient, typically lactose, by aerobic incubation using a *Streptomyces coelicolor*. The resulting lactase exhibits high thermal stability useful where relatively higher temperatures of enzymatic activity are required.

5 Claims, No Drawings

THERMOSTABLE LACTASE

This is a continuation of application Ser. No. 123,857 filed Mar. 12, 1971 and now abandoned.

This invention relates to providing a high thermal stability lactase. In another aspect, it relates to producing hydrolyzed lactose solids at essentially bacteriostatic temperatures. In still another aspect, it relates to improved animal and poultry feeds and feed supplements containing lactase-hydrolyzed lactose as a major carbohydrate source.

According to the present invention, a high thermal stability lactase is produced by *Streptomyces spp.* which is incubated on a conventional nutrient medium relatively high in lactose. This results in a lactase uniquely useful when compared to prior art lactases generally derived from yeast and fungus. This novelly produced lactase will find greater use in reducing the lactose content of milk products, wherein lactase use has been limited because of relatively low heat stability.

In another aspect, the novel lactase can be employed in the use of hydrolyzed lactose in feed, using whey or skim milk solids as substrate. Its advantage lies in that it may be introduced after pH adjustment and during the period of whey concentration without bacterial contamination.

It is, therefore, an object of this invention, to provide a lactase enzyme which has higher thermal stability than latases produced from prior art enzyme sources.

It is another object to employ a lactase which can significantly reduce the lactose content of milk products where it is desired for further processing.

Still another object is in reducing the lactose content of milk during a relatively short incubation period by employing temperatures higher than heretofore possible.

Yet another object is to hydrolyze lactose in whey solids, without bacterial contamination, at the relatively high temperatures normally preferred in the solids concentration and evaporation.

BACKGROUND OF THE INVENTION

Lactase is an enzyme which hydrolyzes the disaccharide lactose to its component sugars glucose and galactose. As a result of the conversion, solubility and sweetness are improved, and the osmotic pressure is increased. Lactose is a β-galactoside, i.e., 4-0-(β-galactopyranosyl)-D-glucopyranose. Therefore, the enzyme which breaks the galactoside bond may also be called β-galactosidase.

Lactase is not used commerically to any extent, although these are some other possible applications of lactase:

1. Increased sweetness in fluid milk without addition of sugars or sweeteners.
2. Softening of cast center candies containing lactose using lactase.
3. Improved fermentation in flour doughs if lactose is converted to the more readily fermented monosaccharides.

Distribution of Lactase (β-galactosidase)

Lactase has been found in almonds, the intestinal mucosa of young animals, and in various microorganisms including yeasts, bacteria and fungi. Most products which have been used as lactases commerically have been derived from lactose fermenting yeasts, usually *Saccharomyces fragilis*, *Zygosaccharomyces lactis*, *Saccharomyces lactis*, or *Candida pseudotropicalis* (*Torula cremoris*). Fungal preparations which have been found to be active as lactases, under certain conditions, are derived from *Aspergillus luchuensis*, *A. oryzae* and *A. niger*. The classical source of bacterial lactase is *Escherichia coli*, but *Lactobacilli* have also been used.

Presumably other microorganisms which grow on lactose as the only source of carbohydrate, can produce enough lactase to support their growth. In support of this thesis, there are literally hundreds of references which note the presence of β-galactosidase in many species of organisms grown on lactose. The bacterial organisms noted include *Streptococcus*, *Diplococcus*, *Mycobacteria*, *Propionibacteria*, *Shigella*, *Enterobacter*, *Bacilli*, *Salmonella*, *Pseudomonas* and *Neisseria*. The low activity found in many of these organisms would probably rule against their practical use.

We are not aware of any publications that mention the presence of β-galactosidase in members of the families which would include the genera *Nocardia* and *Actinomyces* (for the family *Actinomycetaceae*), the genera *Streptomyces*, *Micromonospora*, and *Thermoactinomyces* (for the family *Streptomycetaceae*). The only closely related organisms of the Order *Actinomycetates* in which β-galactosidase has been demonstrated and published were some species of *Mycobacteria* as noted above.

Lactase for the hydrolysis of lactose in milk products has been an item of biological and commerical interest for some time. Products of very low activity were produced in the mid-1930's from *Lactobacilli*, nor were they ever produced on more than laboratory scale. Ice cream of good taste having high skim milk solids was successfully demonstrated, using lactase derived from a lactose fermenting yeast. In these applications, it was necessary to achieve about a 25 percent reduction in lactose to meet the specification of ice cream.

Lactases were also suggested for treating whey from cheese manufacture after the pH was adjusted to the proper value. Research on improving yeast lactase essentially ceased in the late 1950's, when the Standards of Identity for Frozen Desserts were issued, but without the inclusion of lactase as an optional ingredient.

A major limitation to using lactase in processing milk products has been the relatively low heat stability of the available lactases, typically yeast derived. Use of the prior art lactases required either long incubation (several days) at low temperature, or a relatively short (2–4 hours) incubation at 35°–40°C. Any longer incubation at 35°–40°C. promoted very significant bacterial growth. The recent observation that a heat stable lactase can be prepared from *Streptomyces* will alleviate the bacterial spoilage problem.

It is quite clear that a lactase of high heat stability would have a distinct advantage over any lactase preparation previously available or described. It could be used under conditions where the substrate would probably remain sterile, or be rendered essentially sterile during the incubation. This unique property would appear to be a promising advantage.

Most of the early interest in lactase was directed toward lowering the lactose content of milk, so that a higher level of milk solids non-fat could be introduced into ice cream without danger of crystallization.

Non-fat skim milk solids (or whey solids) would be instrumental in obtaining bread with better crust color, if a part of the lactose were more readily converted to its components glucose and galactose. Some saving of sugar addition might also be achieved.

Perhaps the largest area of application for lactase is in the treatment of whey from cheese manufacture. Production of whey in 1963 in the U.S. was about 15 billion pounds per year. Late information indicates that about 22 billion pounds of whey were produced in 1968. The increase is due to increasing consumption of cheese. The 1968 quantity of whey is equivalent to 1 billion pounds of lactose and 170 million pounds of protein.

The low solids content, and seasonal fluctuation in amounts tend to make it costly to utilize whey, thus presently about 50 percent of the whey is discarded as waste. The BOD of whey is very high, and at a level of 1,000 gallons per day the waste disposal load is equivalent to population of 1,800. Growth of lactose fermenting yeasts on the whey to produce edible yeast is a seeming method of obtaining a demonstrably nutritious product from the whey. A considerable amount of work was carried out toward this end on whey yeasts in Sweden and Germany during the 1940's.

It has been noted, however, that the cost of the lactase yeast cannot compete with yeast (*Torula spp.*) produced by growth on wood pulp sulfite waste liquor which has presumably limited the utilization of whey yeast.

Use of whey in animal rations has been limited by the high content of lactose (about 67 percent of dry weight). Infants and young animals have a high tolerance for lactose, but as the animal reaches maturity lactase deficiencies develop and the ability to utilize lactose decreases. Cattle and pigs show this effect in aging. Apparently, poultry have lactose intolerance at all ages. Feeding of high levels of lactose to lactase deficient animals (and certain human populations with hereditary deficiencies) leads to diarrhea and other symptoms resulting from bacterial fermentation in the lower intestinal tract.

As early as 1953, a commerical lactose hydrolyzed whey was reported to have good nutritional properties in poultry feeding. It was recently reported that delactosed whey was superior to regular whey in cattle feed. U.S. Pat. No. 2,781,266 claims the use of hydrolyzed lactose in feed, using whey or skim milk solids as substrate. All of these efforts apparently involved yeast lactase.

The heat advantage of the *Streptomyces* could be of value in these field applications. The heat stable lactase could be added to the whey after pH adjustment, and allowed to incubate at comparatively high temperature (60°–65°C), during the period of concentration and evaporation but without bacterial contamination. A crude form of the lactase so produced would probably be adequate, and taste would be a relatively minor problem.

THE INVENTION

Our experimental work indicates that *Streptomyces spp.* can produce a unique lactase, in that activity is exhibited at a temperature (70°C.), which is above the usual milk pasteurization temperature. All previously described lactases show optimal activity below the pasteurization range. Therefore, when used in milk products significant increases in bacterial growth occur during the time required for lactase action. Usually this problem limits the use of known lactases to an incubation period of 2–4 hours at 30°–40°C., or 1–2 days at 4°C. on fluid milk.

Properties of β-Galactosidase (Lactase) of *Streptomyces Coelicolor*

This enzyme is produced by culturing an inoculum organism of the genus *Streptomyces* in the temperature range of 20° to 50°C., on a nutrient medium containing lactose under aerobic conditions.

The medium also requires incorporation of a proteinaceous material, typically chosen from one of autolyzed yeast (or Yeast extract), liver and gland meal, liver meal, and blood meal, constituting up to three weight percent.

An example of growing nutrient for *S. coelicolor* and process for preparation of a lactase enzyme concentrate is given in Table I.

Composition of Examplary Growing Nutrient for S. coelicolor to Produce Heat Stable Lactase

| | |
|---|---|
| Lactose | 2% |
| Liver and Gland Meal | 1% |
| $K_2HPO_4$ | 0.6% |
| $MgSO_4 \cdot 7H_2O$ | 0.1% |
| $CoCl_2$ | 0.03% |

Preparation of Lactase Enzyme Concentrate

A concentrate is prepared from crude culture by adding four volumes of cold isopropanol to a crude culture grown on lactose medium. Initial precipitate is allowed to settle, and washed two times with fresh isopropanol. The final precipitate was dried *in vacuo*. Yield = 46.4 grams from 3,150 g. of culture.

The β-galactosidase activity of *S. coelicolor* grown on lactose medium at 40°C., was determined at pH 4, 5, 6, and 7, using O-nitrophenyl-β-galactoside (ONPG). The results were as follows:

| pH | Activity (Micro moles hydrolyzed/min/mg of E) |
|---|---|
| 4.0 | 0 |
| 5.0 | .00195 |
| 6.0 | .00515–.00595 |
| 7.0 | .0032 |

The pH optimum was thus settled on as 6.0, through a range of slightly acid to neutral pH is operable. Similar preparations of *S. coelicolor* variant grown on a medium free of lactose produced significantly less activity (0.00016 *u* moles/mg/min), at the optimum pH. The medium requires a carbohydrate component at a concentration of from 0.25 to 2 percent by weight.

The preparation made from *S. coelicolor* grown on lactose medium, was then tested fro β-galactosidase activity on ONPG at 50°, 60°, 65° 70°, and 80°C., with the following results obtained at pH 6.0.

| Temperature °C. | Activity *u* moles/mg E/min |
|---|---|
| 40 | 0.006 |

-Continued

| Temperature °C. | Activity u moles/mg E/min |
|---|---|
| 50 | 0.0116 |
| 60 | 0.0154 |
| 65 | 0.0174 |
| 70 | 0.0149 |
| 80 | 0 |

The optimum temperature was thus settled on as 65°C., though 60° to 70°C. is an operable range. In the present invention, the temperature range is sufficient to cause lactose hydrolysis at a rate of 0.02 to 0.1 percent per hour. Coincidentally, pasteurization (low temperature process) is usually carried out for 30 minutes at 61.5°-63°C. (142.5°-145°F.) At 65°C. the enzyme activity is about three times greater than at 40°C., which is presently only about one-tenth the level exhibited by known fungal and yeast concentrates, necessarily prepared and used at 40°C. Yet, the fungal and yeast enzyme concentrates have no activity at 65°C.

The activity of the S. coelicolor preparation must be considered to be of somewhat low order, but the maximum activity is exerted at a temperature close to pasteurization and, therefore, is potentially quite useful and desirable. A large part (two-thirds) of the β-galactosidase activity of the S. coelicolor preparation was intracellular.

Published work with glucose isomerase derived from species of Streptomyces had indicated that this enzyme has a marked sensitivity to certain metallic ions, among them $Cu^{++}$, $Fe^{+++}$, and $Ca^{++}$. Since all of these are found in milk, it was of interest to determine the sensitivity of the present β-galactosidase from S. coelicolor to these ions, using the ONPG method at pH 6.0 and 65°C. The β-galactosidase was tested by the ONPG method in the presence of 0.001 and 0.0001 molar concentrations of Cu acetate, ferric chloride, and calcium acetate, then compared with a control free of added salts. The results were as follows:

| Metallic Salt | Concentration Molar | β-galactosidase Activity % of Control-Free of Metallic Salt |
|---|---|---|
| Copper ($Cu^{++}$) acetate | 0.0001 | 38 |
| acetate | 0.001 | 7 |
| Ferric Chloride | 0.0001 | 100 |
|  | 0.001 | 11 |
| Calcium Acetate | 0.0001 | 104 |
|  | 0.001 | 93 |

Copper appears to have a very harmful effect on this β-galactosidase activity. The effect of iron is somewhat harmful, but only at relatively high levels. The effect of calcium was not significant.

The effect of the Streptomyces-derived β-galactosidase was also checked on a milk substrate prepared from dried skim milk, diluted with water to the normal solids concentration present in milk (10 percent ≈ 4.5 percent lactose). The milk was incubated at 65°C. both at pH 6.55 (ambient pH), and pH 6.0 for 30, 60, and 120 minutes, using levels of enzyme equivalent to 1 and 10 percent of the lactose concentration. After incubation, the milk samples were deproteinized with sulfuric acid, and the clear filtrates were tested for the presence of glucose and fructose to measure the extent of hydrolysis of the lactose and its isomer lactulose in the milk.

There was no significant production of fructose under the incubation conditions used. The production of glucose from the lactose in the milk was about as expected on the basis of the ONPG activity. At pH 6.0, the activity was 0.0175 μ moles lactose hydrolyzed per mg E per minute and at pH 6.5 the activity was 0.0145 μ moles lactose hydrolyzed per mg E per minute.

The Streptomyces used according to this invention, for the production of lactase, has been designated as Streptomyces Coelicolor. One of its strain characteristics is the production of a thermostable lactase. A subculture of this variety can be obtained from the permanent collection of the American Type Culture Collection, Rockville, Md. Its accession number in this repository is ATCC21666.

We claim:
1. A method for producing heat stable lactase comprising:
    a. providing a nutrient medium containing lactose and including an inoculum organism of the species Streptomyces coelicolor said medium which contains a carbohydrate at a concentration from 0.25 to 2.0 percent by weight; cobalt, magnesium, phosphate ions in at least trace amounts; a proteinaceous material and $H_2O$;
    b. incubating said medium in a temperature range sufficient to cause lactose hydrolysis at a rate of 0.02–0.1 percent per hour;
    c. maintaining the pH of said medium ranging from slightly acid to neutral during incubation, and;
    d. recovering the lactase produced by said organism.

2. The process of claim 1 wherein said proteinaceous material is selected from one of autolyzed yeast, liver and gland meal, liver meal, and blood meal in an amount up to about three percent by weight.

3. The process of claim 1 wherein the incubation temperature ranges from 20° to 50°C.

4. The process of claim 1 wherein said pH is maintained at about 6 during incubation.

5. A thermal stable lactase prepared by the method of claim 1 having optimum enzyme activity at a pH of about 6.0 at a temperature of about 65°C.

* * * * *